United States Patent
Xiong et al.

(10) Patent No.: US 11,297,156 B1
(45) Date of Patent: Apr. 5, 2022

(54) SYSTEM FOR PROCESSING DATA USING DISTRIBUTED MESSAGING SYSTEM AND DATA PROCESSING METHOD THEREOF

(71) Applicant: Coupang Corp., Seoul (KR)

(72) Inventors: Eric Xiong, Seoul (KR); Sung Ihk Yang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/153,278

(22) Filed: Jan. 20, 2021

(30) Foreign Application Priority Data

Dec. 24, 2020 (KR) .................. 10-2020-0183462

(51) Int. Cl.
| | |
|---|---|
| H04L 29/08 | (2006.01) |
| G06Q 10/06 | (2012.01) |
| H04L 67/568 | (2022.01) |
| H04L 67/566 | (2022.01) |
| H04L 67/563 | (2022.01) |

(52) U.S. Cl.
CPC .... H04L 67/2842 (2013.01); G06Q 10/06311 (2013.01); H04L 67/2814 (2013.01); H04L 67/2833 (2013.01)

(58) Field of Classification Search
CPC . H04L 67/28–67/2842; H04L 67/1097; G06Q 10/063–10/06311
See application file for complete search history.

(56) References Cited

U.S. PATENT DOCUMENTS

| | | | | |
|---|---|---|---|---|
| 10,402,385 | B1* | 9/2019 | Pierce | G06F 16/2365 |
| 10,963,846 | B1* | 3/2021 | Cunliffe | G06Q 20/12 |
| 2014/0052827 | A1* | 2/2014 | Tanimoto | H04L 67/025 |
| | | | | 709/219 |
| 2018/0052861 | A1 | 2/2018 | Seetharaman et al. | |
| 2018/0146034 | A1 | 5/2018 | Lintner et al. | |
| 2018/0365785 | A1* | 12/2018 | Boss | G06T 19/006 |
| 2019/0129763 | A1 | 5/2019 | Matsuura et al. | |

(Continued)

FOREIGN PATENT DOCUMENTS

| | | |
|---|---|---|
| JP | 2019-533206 A | 11/2019 |
| JP | 6668456 B2 | 3/2020 |

(Continued)

OTHER PUBLICATIONS

Ito, Masahiro, "Apache Kafka Overview and Architecture," 2018 https://qiita.com/sigmalist/items/5a26ab519cbdf1e07af3.

(Continued)

*Primary Examiner* — Clayton R Williams (74) *Attorney, Agent, or Firm* — Knobbe, Martens, Olson & Bear, LLP (57) ABSTRACT

According to the present disclosure, a method of processing data in a data processing system using a distributed messaging system may include acquiring, by a first server, event information associated with at least one item, transmitting, by the first server, a job creation request to a distributed message server based on the acquired event information, acquiring, by a second server, a job request message generated in the distributed message server based on the job creation request, processing, by the second server, event information using at least one processor based on the job request message, and transmitting, by the second server, the processed event information to a front-end-related server.

13 Claims, 6 Drawing Sheets

(56) References Cited

U.S. PATENT DOCUMENTS

2019/0379758 A1   12/2019  Roh
2020/0387412 A1   12/2020  Kyeong et al.

FOREIGN PATENT DOCUMENTS

| | | |
|---|---|---|
| KR | 10-0155321 B1 | 7/1998 |
| KR | 10-0521415 B1 | 10/2005 |
| KR | 10-2013-0028554 A | 3/2013 |
| KR | 10-1525795 B1 | 6/2015 |
| KR | 10-2017-0131001 A | 11/2017 |
| KR | 10-2020-0140078 A | 5/2018 |
| KR | 10-2019-0139096 A | 12/2019 |

OTHER PUBLICATIONS

Ito, Masahiro, "Apache Kafka Producer / Broker / Consumer Mechanism and Settings List," 2018 https://qiita.com/sigmalist/items/3b512e2ab49b07271665.

\* cited by examiner

| Requester: | AAA | Requested ID: | Requested ID, UUID format | Search | ◯Not updated | 2020-02-16 18:18:04 updated | + Add operation |
|---|---|---|---|---|---|---|---|
| ID | Status | | Tracking progress<br>Requested \| Duplicated \| Success \| Fail<br>Suspended | | Creator<br>File name | Date of creation (KST)<br>Date of update (KST) | Action |
| 3 | Registered Deployed<br>Executed Completed | | 601,813 \| 601,197 \| 616 \| 0 ⊙ | | AAA<br>202002_agingtf_2.csv | 2020-02-13 06:04:52<br>2020-02-13 06:12:51 | ⏸Pause<br>▷Resume |
| 2 | Registered Deployed<br>Executed Completed | | 601,813 \| 600,528 \| 1,285 \| 0 ⊙ | | AAA<br>202002_agingtf_1.csv | 2020-02-13 05:48:28<br>2020-02-13 06:01:50 | ⏸Pause<br>▷Resume |

410 — Status column
420 — Tracking progress column

| Detailed information of operation | ✕ |
|---|---|

| Operation ID | 3 |
|---|---|
| Requested ID | 38305791-a88a-4fc0-88b5-78c89387e11d |
| Status of operation | [Registered] [Deployed] [Executed] [Completed] |
| Requester | AAA |
| Date of creation(KST) | 2020-02-13 06:04:52 |
| Date of update(KST) | 2020-02-13 06:12:51 |
| Requested file name | 202002_agingtf_2.csv |
| Number of requested operations | 601,813   [⬇ Requested file] |
| Number of duplicated processing | 601,197 |
| Number of successful operations | 616   [ⓘ View details] | [⬇ Successful result] |
| Number of failed operations | 0   [ⓘ View details] | [⬇ Failed file] |
| Action | [⏸ Pause] | [▶ Resume] |

> Raw information of operation

[Cancel] [OK]

SYSTEM FOR PROCESSING DATA USING DISTRIBUTED MESSAGING SYSTEM AND DATA PROCESSING METHOD THEREOF

BACKGROUND

Technical Field

The present disclosure relates to a data processing system for processing event information using a distributed messaging system and a data processing method thereof.

Description of the Related Art

With developments of electronic technologies, services using electronic technologies have been settled in our daily lives. Since such services are provided to a large number of users, it is frequently necessary to process a large amount of data in proportion to the number of users. For example, when an event related to a product is to be created in an e-commerce service, the event may be provided to a plurality of customers. Thus, a large amount of event information is required to be processed in proportion to the number of customers to be provided with the event information.

In the case of processing such a large amount of data, a large amount of time is required in proportion to data throughput. However, because time is limited, there is a desire for a method to more efficiently process a large amount of data in this context.

SUMMARY

Technical Goals

An aspect provides an electronic apparatus for processing event information using at least one processor based on a distributed messaging system such that data processing is performed with increased efficiency and speed, and a control method thereof.

Technical goals to be achieved by the present example embodiments are not limited to the above-described technical goals and may further include other technical goals.

Technical Solutions

According to an example embodiment, there is provided a method of processing data in a data processing system using a distributed messaging system, the method including acquiring, by a first server, event information associated with at least one item, transmitting, by the first server, a job creation request to a distributed message server based on the acquired event information, acquiring, by a second server, a job request message generated in the distributed message server based on the job creation request, processing, by the second server, event information using at least one processor based on the job request message, and transmitting, by the second server, the processed event information to a front-end-related server.

According to another example embodiment, there is provided a system for processing data using a distributed messaging system, the system including a first server configured to acquire event information associated with at least one item and transmit a job creation request to a distributed message server based on the acquired event information, the distributed message server configured to transmit a job request message to a second server based on the job creation request, and the second server configured to process event information using at least one processor based on the job request message and transmit the processed event information to a front-end-related server.

According to a still another example embodiment, there is also provided a non-transitory computer-readable recording medium including a computer program for performing a method of processing data in a data processing system using a distributed messaging system, the method including acquiring, by a first server, event information associated with at least one item, transmitting, by the first server, a job creation request to a distributed message server based on the acquired event information, acquiring, by a second server, a job request message generated in the distributed message server based on the job creation request, processing, by the second server, event information using at least one processor based on the job request message, and transmitting, by the second server, the processed event information to a front-end-related server.

Details of other example embodiments are included in the detailed description and the accompanying drawings.

Effects

According to the present disclosure, it is possible to provide a data processing system and a data processing method to process event information using at least one processor based on a distributed messaging system such that data processing is performed with increased efficiency and speed.

Further, according to the present disclosure, a data processing system may use a distributed cache system for allowing a job suspension to be possible during data processing, thereby controlling the data processing.

Effects of the present disclosure are not limited to the effects mentioned above and other effects not mentioned will become apparent to those skilled in the art from the description of the claims.

DETAILED DESCRIPTION

Terms used in example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element.

Throughout the specification, the expression "at least one of A, B, and C" may include the following meanings: A alone; B alone; C alone; both A and B together; both A and C together; both B and C together; and all three of A, B, and C together.

The term "electronic apparatus" mentioned below may also be referred to as an "electronic device" and may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. However, the present disclosure may be implemented in various different forms but it is not limited to the exemplary embodiments described herein.

Hereinafter, example embodiments of the present disclosure will be described with reference to the drawings.

Figure 1:
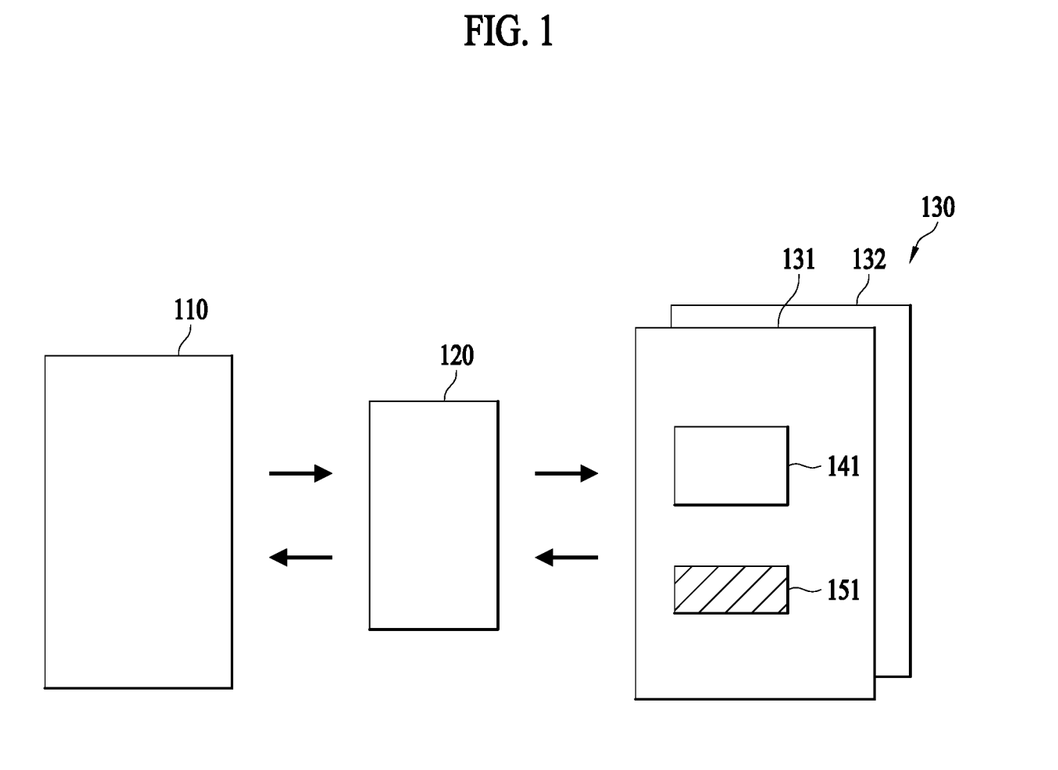
FIG. 1 is a diagram illustrating a data processing system according to an example embodiment.

FIG. 1 is a diagram illustrating a data processing system according to an example embodiment. FIG. 1 illustrates only components related to the present embodiment. However, it is apparent to those skilled in the art that other general-purpose components may be further included in addition to the components illustrated in FIG. 1.

Referring to FIG. 1, a data processing system (hereinafter, referred to as a "system") 100 may include a first server 110, a distributed message server 120, and at least one server 130. The first server 110, the distributed message server 120, and the at least one server 130 may each include a memory and a processor. In addition, each of the first server 110, the distributed message server 120, and the at least one server 130 may be a unit that processes at least one function or operation and may be implemented through hardware, software, or a combination of hardware and software.

The first server 110 may acquire event information associated with at least one item. The at least one item may include, for example, at least one product sold online. The event information may be information on or regarding an event to be generated. The event may include, for example, a discount event (or discount promotion) of at least one item.

In the example embodiment, the event information may be acquired based on an input of a user but is not limited thereto. The event information may be generated based on information stored in a database of the first server 110 or the system 100. An example of acquiring event information based on an input of a user will be described with reference to FIG. 5.

The event information may include at least one of, for example, a number of events, a discount amount, an event name, an event type, a delivery type, an item type, a sales period, a discount payment type, an event start time, and an event end time. The number of events may include the number of events to be created through the data processing described below. The discount amount may include an amount discounted through the event. The event type may include whether an event corresponds to, for example, a flat rate discount type that discounts a specific amount or a percentage discount type that discounts an amount by a specific percentage. The delivery type may include, for example, whether a shipping fee is free. The discount payment type is a payment type for applying a discount and may include, for example, a specific credit card or a specific payment method.

In the example embodiment, the event information may be randomly generated. Specifically, the event information may be generated based on a random combination of information stored in the database. For example, the database may include a plurality of pieces of information (e.g., 1000 won, 3000 won) on the discount amount and a plurality of pieces of information (e.g., clothing, food) on the item type. In this example, one of the plurality of pieces of information on the discount amount and one of the plurality of pieces of information on the item type are randomly selected and combined, so that the event information may be generated. For example, a 1000-won discount event for food or a 3000-won discount event for clothing may be created.

In some cases, the event information may be generated based on a combination of information stored in the database, reflecting a current situation. For example, when the current situation is summer, event information may be generated based on a random combination of information related to summer in the database. In this example, the event information corresponding to the current situation (e.g., summer) may be determined in advance.

Meanwhile, the generation of the event information may be performed by the first server 110, but is it merely an example. In some cases, the generation of the event information may be performed by a separate component included in the system 100 or a component separate from the first server 110.

In the example embodiment, the first server 110 may include a stateful server. Specifically, the first server 110 may track a state of communication with another connected electronic device (e.g., the second server. an external device (not shown)) in real time and use the tracked state of communication for providing a service of the first server 110. For example, the first server 110 may track information on a result of data transmission and reception with another electronic device in real time, quickly provide the other electronic device with a response thereto, and change its operation state in real time based on the tracked information.

The first server 110 may transmit the job creation request to the distributed message server 120 based on the event information. For example, when the event information is acquired, the first server 110 may transmit the job creation request to the distributed message server 120 to request the event information to be generated. The first server 110 may use the distributed message server 120 to provide the event information to a second server 131.

The distributed message server 120 may include a server that controls received information to be distributed to another device. The distributed message server 120 may include a distributed messaging system, for example, Apache Kafka® but not be limited thereto.

In the example embodiment, the distributed message server 120 may include a plurality of partitions related to data transmission. Each of the plurality of partitions may be mapped to another device (e.g., the at least one server 130). In this case, the information received from the first server 110 may be classified based on the plurality of partitions and transmitted to the other device.

In an example embodiment, message transmission may be performed in a manner that the distributed message server 120 transmits the job request message to a predetermined logical location and a server corresponding to each of the plurality of partitions acquires a message stored in the logical location. For example, the distributed message server 120 may allocate the information received from the first server 110 to the plurality of partitions, so that the server (e.g., the second server 131, a third server 132) corresponding to each of the plurality of partitions acquires the job request message based on a connection with the plurality of partitions. Specifically, for example, a portion (e.g., a job request message to generate 5000 discount events) of the information (e.g., a job request message to generate 10000 discount events) received from the first server 110 may be allocated to a first partition of the distributed message server 120. Also, another portion (e.g., a job request message to generate remaining 5000 discount events) of the information received from the first server 110 may be allocated to a second partition. In this example, the information allocated to the first partition may be acquired by a server mapped to the first partition among the at least one server 130. Also, the information allocated to the second partition may be acquired by a server mapped to the second partition among the at least one server 130.

In another example embodiment, the distributed message server 120 may transmit a job request message to a server (e.g., the second server 131, the third server 132) corresponding to each of the plurality of partitions. As an example, when a job creation request is a request for generating 10000 discount events, the distributed message server 120 may divide the job creation request and transmit a job request message for generating 5000 discount events to each of the at least one server 130. As another example, when a job creation request is a request for generating 10000 discount coupons, the distributed message server 120 may divide the job creation request and transmit a job request message for generating 5000 discount coupons to each of the at least one server 130.

Hereinafter, for convenience of explanation, a description is given based on an operation of the second server 131. An operation corresponding to the operation of the second server 131 may also be performed by another server, for example, the third server 132 included in the at least one server 130. FIG. 1 illustrates that the at least one server 130 includes two servers (e.g., the second server 131 and the third server 132), but it is merely an example. The at least one server 130 may include more servers corresponding to the second server 131 or the third server 132.

The second server 131 may process the event information using at least one processor 141 based on the job request message. Specifically, the second server 131 may include the at least one processor 141 and use the at least one processor 141 to perform an operation corresponding to the job request message so as to process the event information. For example, when the job request message includes a message to generate 5000 discount events, the at least one processor 141 may generate the 5000 discount events. Through this, the processing of the event information allocated to the second server 131 may be performed.

In the example embodiment, the at least one processor 141 may be implemented as a plurality of processors. In this case, the job request message allocated to the second server 131 may be divided so as to be processed by the respective processors. Depending on cases, an amount by which the job request message is divided for each of the processors may vary based on performance of the corresponding processor and a type of event information. For example, when event information corresponds to first type event information, a job request message may be allocated to a first processor and a second processor at a ratio of 1:1. Also, when event information corresponds to second type event information, a job request message may be allocated to the first processor and the second processor at a ratio of 2:1.

The second server 131 may transmit the processed event information to the front-end-related server. The front-end-related server may include a server that provides a service using actual event information. For example, when event information is a discount event, the front-end-related server may include a server corresponding to a website that provides the discount event.

In the example embodiment, the second server 131 may include a stateless server. Specifically, the second server 131 may provide a service based on an input received from another connected electronic device (e.g., the first server 110 or the distributed message server 120). As such, unlike the first server 110 that identifies a communication state in real time and control an operation based on the communication state, the second server 131 may perform an operation in accordance with an input received from another device. The second server 131 may stably perform an operation irrespective of a communication state.

In the example embodiment, the second server 131 may include a distributed cache system (memcached). The distributed cache system may include a configuration in which at least a portion of data or objects to be read is cache-processed in order to reduce the number of readings from an external data source. The distributed cache system may be implemented through software but is not limited thereto.

In the example embodiment, when the second server 131 includes the distributed cache system, the at least one processor 141 of the second server 131 may share the distributed cache system. For example, when at least one processor includes a first processor and a second processor, the distributed cache system may be used by each of the first processor and the second processor.

In the example embodiment, the distributed cache system may store information associated with job suspension. For example, the distributed cache system may store the job suspension-related information shared by the at least one server 130 or the at least one processor 141. The job suspension-related information may include flag information indicating the job suspension. In this case, when a message received from the distributed message server 120 includes the information associated with the job suspension, the at least one processor 141 may suspend event information processing corresponding to the received message.

Specifically, for example, the second server 131 may create an event A based on a job request message for creating the event A. In a process of creating the event A, the second server 131 may receive a new job request message. In this case, the second server 131 may identify whether the received new job request message corresponds to information stored in the distributed cache system. When the received new job request message corresponds to the information stored in the distributed cache system, the second server 131 may suspend processing an event corresponding to the new job request message. In this instance, if the event corresponding to the new job request message is the event A, the creation of the event A may be suspended.

In the example embodiment, the second server 131 may receive a request for suspension to suspend an operation or, for example, a job. As an example, the second server 131 may receive, from the distributed message server 120, a message including predetermined information indicating the request for suspension. As another example, the second server 131 may receive a message including predetermined information indicating the request for suspension from another device (e.g., the front-end-related server). The second server 131 may suspend processing a job request message corresponding to the request for suspension and record a state of the message for which the processing is suspended, as a suspended state. Here, the state of the message may be recorded in the distributed cache system, but not be limited thereto.

In some cases, the second server 131 may identify whether the received request for suspension corresponds to information stored in the distributed cache system. For example, as described above, the distributed cache system may include the information associated with the job suspension. In this example, when the received request for suspension corresponds to the information stored in the distributed cache system, the second server 131 may suspend processing the job request message in response to the request for suspension. The second server 131 may record a state of the message for which the processing is suspended, as a suspended state.

The second server 131 may upload at least a portion of the message recorded as the suspended state to a database associated with the first server. Here, the database may correspond to a database in which information associated with the aforementioned event information generation. However, it is merely an example, the database may correspond to a separate database in some cases.

In the example embodiment, the request for suspension may be generated in response to a job processing time of the front-end-related server exceeding a predetermined value. In this case, the second server 131 may receive the request for suspension in response to a job processing time of the front-end-related server exceeding a predetermined value. The request for suspension may be provided from the front-end-related server to the second server 131, but is not limited thereto. The request for suspension may be provided from another server, for example, the first server 110 that senses an operating state of the front-end-related server to the second server 131.

In an example embodiment, a request for suspension may be generated in a case in which a job processing time related to the event provision of the front-end-related server exceeds a predetermined period of time. For example, the case in which a job processing time related to the event provision of the front-end-related server exceeds a predetermined period of time may include a case in which, in accordance with an event that is a creation of 10000 discount coupons, the discount coupons have to be provided to 10000 users but a time required to provide the discount coupons exceeds a predetermined period of time. 10000. The predetermined period of time may be determined based on a type of an event. The front-end-related server may identify the predetermined period of time in response to processed event information being received. When a time required to provide the event exceeds the predetermined period of time, the front-end-related server may generate the request for suspension. When a server other than the front-end-related server, for example, the first server is connected to the front-end-related server, the first server may identify whether to generate the request for suspension and generate the request for suspension.

In another example embodiment, a request for suspension may be generated in a case in which a current time of the front-end-related server is different from a predetermined period (e.g., an event discount period, an event provision period) related to an event. For example, the case in which a current time of the front-end-related server is different from a predetermined period (e.g., an event discount period, an event provision period) related to an event may include a case in which a current time of the front-end-related server is Dec. 20, 2020, and a predetermined period related to an event is from Nov. 11, 2020, to Nov. 20, 2020. In some cases, the case in which a current time of the front-end-related server is different from a predetermined period (e.g., an event discount period, an event provision period) related to an event may include a case in which the current time is previous to the predetermined period, but not be limited thereto.

In another example embodiment, a request for suspension may be generated in a case in which the number of inputs received from a customer (or an electronic device of a customer) in response to the event information being provided through the front-end-related server exceeds the predetermined number of inputs. For example, the request for suspension may be generated in a case in which customer's response inputs (e.g., use of coupons) to a current event are greater than or equal to the predetermined number or ratio (e.g., 80% of the total coupons provided).

In the example embodiment, the request for suspension may be generated by an input of a user. For example, the request for suspension may be generated in a case in which a predetermined input is received in the first server 110 from the user. In this example, the second server 131 may receive the request for suspension from the first server 110 through the distributed message server 120.

In the example embodiment, the first server 110 may identify a resuming request for at least a portion of the message uploaded in the database and recorded as the suspended state. Through the distributed message server 120, the first server 110 may transmit at least a portion of a message corresponding to the resuming request from the first server 110 to the second server 131. In this case, the second server 131 may resume the processing corresponding to the received message.

In some cases, information on the resuming request may be stored in the distributed cache system in advance. Also, the message suspended by the request for suspension may be stored in the distributed cache system. In such cases, the first server 110 may transmit the information on the resuming request to the second server 131 through the distributed message server 120 in response to the resuming request being identified. When the information on the received resuming request corresponds to the information stored in the distributed cache system, the second server 131 may identify a message corresponding to the resuming request in the distributed cache system and resume processing. For example, when the received information on the resuming request corresponds to the information stored in the distributed cache system, the second server 131 may identify a message corresponding to the resuming request among the suspended message in the distributed cache system and perform processing on the identified message.

In the example embodiment, the resuming request may be generated based on an input of a user or a state of the front-end-related server. As an example, the resuming request may be generated by the first server 110 based on a reception of a predetermined user input indicating resuming. As another example, the resuming request may be generated by the second server 131 or a device (e.g., the first server 110) detecting a state of the second server 131 when an operation error of the second server 131 is solved.

In the example embodiment, the second server 131 may transmit the processed event information to the first server 110 through the distributed message server 120. Through this, the first server 110 may acquire an execution operation of the requested job.

Meanwhile, as described above, the event information may be divided and processed by the at least one server 130. In this case, the first server 110 may receive the event information processed by each of the at least one server 130. A data processing rate of at least some of the at least one server 130 may differ. In this case, the first server 110 may receive the processed event information, for example, processing results of the event information at different points in time. In response to the processed event information being received, the first server 110 may provide information on the processing result of the event information. For example, when processing results are acquired from some of the at least one server 130, the first server 110 may provide information indicating that a processing status of the information is "being processed." When processing results are acquired from all of the at least one server 130, the first server 110 may provide information indicating that the processing status of the information is "completed."

Figure 2:
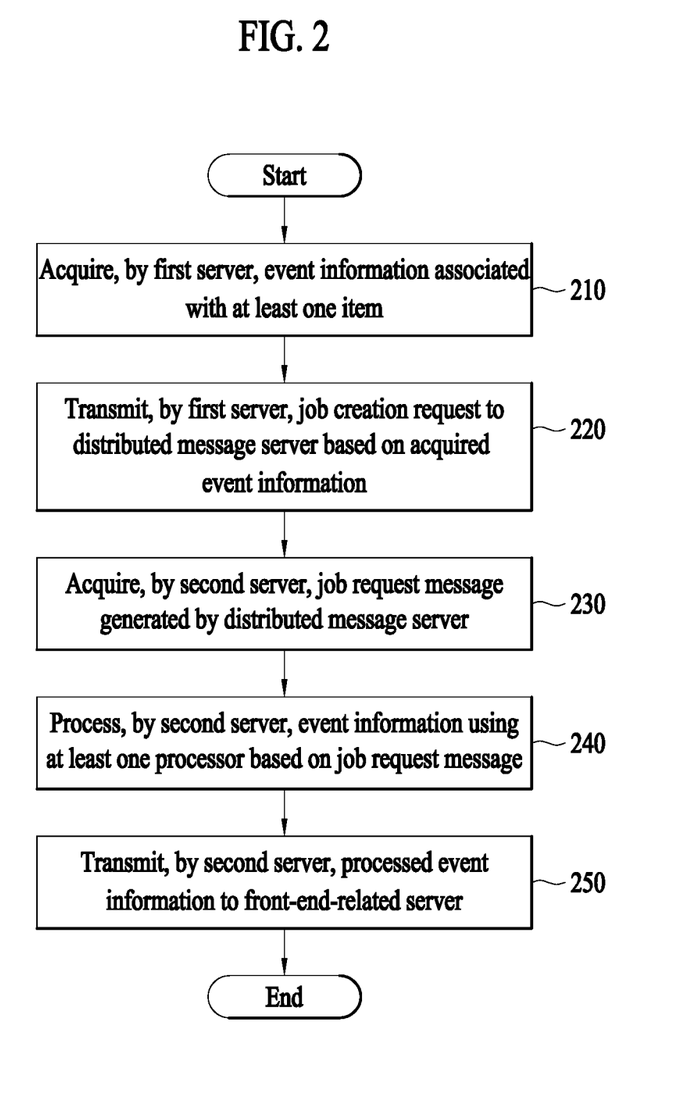
FIG. 2 is a flowchart illustrating a data processing method of a data processing system according to an example embodiment.

FIG. 2 is a flowchart illustrating a data processing method of a data processing system according to an example embodiment. Operations illustrated in FIG. 2 may be performed in different orders or irrespective of an order depending on cases. Since the description made with reference to FIG. 1 is also applicable here, repeated description of FIG. 2 will be omitted.

Referring to FIG. 2, in operation 210, a first server may acquire event information associated with at least one item. At least one item may include, for example, an item sold at a web site, but is not limited thereto. Event information is information on an event to be provided in association with at least one item and may include, for example, discount promotion information. The event information may include various information associated with a discount promotion, for example, at least one of a number of events, a discount amount, an event name, an event type, a delivery type, an item type, a sales period, a discount payment type, an event start time, and an event end time.

In the example embodiment, the event information may be acquired by the first server in response to the first server or another device generating the event information. However, it is merely an example, and the first server may acquire the event information based on an input of a user in some cases.

In operation 220, the first server may transmit a job creation request to a distributed message server based on the acquired event information. When the event information is acquired, the first server may transmit the job creation request for requesting the distributed message server to create an event corresponding to the event information. The event corresponding to the event information may be a service created based on the event information and may include, for example, a discount event or a coupon creation event.

The event may be generated based on processing of the event information. A processing method of the event information, for example, how to combine the event information or an algorithm to which the event information is to be applied may be determined in advance.

In operation 230, a second server may acquire a job request message generated by the distributed message server based on the job creation request. When the job creation request is received, the distributed message server may allocate the job request message to a partition mapped to the second server based on the job creation request so that the job request message is acquired by the second server. In this case, the job request message may be included in the job creation request but is not limited thereto. In some cases, the distributed message server may generate the job request message based on the job creation request.

In the example embodiment, the job request message may include at least a portion of the event information, for example, information on an operation allocated to the second server. In this case, the second server may create an event using at least a portion of the event information received based on the information on the operation allocated to the second server.

Meanwhile, the second server may correspond to one of at least one server connected to the distributed message server. In this case, when the second server acquires the job request message, servers other than the second server included in at least one server may acquire the job request message.

In operation 240, the second server may process the event information using at least one processor based on the job request message. The second server may include at least one processor. In this case, the second server may use at least one processor for processing the event information to create an event corresponding to the job request message. The event allocated to the second server may be created based on the processing of the event information.

In operation 250, the second server may transmit the processed event information to a front-end-related server. For example, when the processing of the event information is completed, the second server may transmit the processed event information to the front-end-related server. The front-end-related server is a server that provides a service using an event and may include, for example, a server for managing a web site but not be limited thereto.

In the example embodiment, the processed event information may be executed in response to the front-end-related server being transmitted, so that the event is provided to a user using the service.

In the example embodiment, in response to the event information being processed, the second server may transmit information indicating that the processing of the event information is completed to the first server. The transmission may be performed through the distributed message server.

In the example embodiment, when the information indicating that the processing of the event information is completed is received from the second server, the first server may provide state information of the processing of the event information to a user of the first server. A related example will be described in greater detail with reference to FIG. 4 or 6.

In the example embodiment, the data processing system may include a distributed cache system. For example, the distributed cache system may be included in the second server, but not be limited thereto. In some cases, the distributed cache system may be provided as a separate component and connected to another device such as the first server and the second server.

In the example embodiment, the distributed cache system may store information associated with job suspension. In this case, the second server may identify whether a message received using the distributed cache system is related to the job suspension. When the message is related to the job suspension, the second server may suspend processing the message. For example, when the message is received, the second server may identify whether the message includes a request for suspension using the distributed cache system. When the message includes the request for suspension, the second server may suspend a processing operation corresponding to the received message.

In the example embodiment, when data processing for the message is suspended, the second server may transmit, to the first server, information on the message for which the processing is suspended. The first server may store the received information in a database related to the first server. In some cases, an input for resuming the processing of the message for which the processing is suspended may be received. In such cases, the first server may transmit a request for resuming to the second server to resume the processing of the message. The second server may identify the message corresponding to the request for resuming and perform the processing associated with the identified message.

In some cases, when processing of a message is suspended, the message for which the processing is suspended may be stored in the distributed cache system. In such cases, the second server may identify the processing-suspended message stored in the distributed cache system in response to the request for resuming being received. The second server may resume the processing for the identified message.

In the example embodiment, the above-described request for suspension may be generated based on at least one of a state of a server related to a front end and an input of a user to the first server. For example, the request for suspension may be generated when an error occurs during event provision of the server related to the front end. Specifically, for example, the request for suspension may be generated in a case in which a job processing time related to the event provision of the front-end-related server exceeds a predetermined period of time, a case in which a current time of the front-end-related server is different from a predetermined period (e.g., an event discount period, an event provision period) related to an event, or a case in which the number of inputs received from a customer (or an electronic device of a customer) in response to the event information being provided through the front-end-related server exceeds the predetermined number of inputs.

Specifically, for example, the case in which a job processing time related to the event provision of the front-end-related server exceeds a predetermined period of time may include a case in which, in accordance with an event that is a creation of 10000 discount coupons, the discount coupons have to be provided to 10000 users but a time required to provide the discount coupons exceeds a predetermined period of time. 10000. The predetermined period of time may be determined based on a type of an event. The front-end-related server may identify the predetermined period of time in response to processed event information being received. When a time required to provide the event exceeds the predetermined period of time, the front-end-related server may generate a request for suspension. When a server other than the front-end-related server, for example, the first server is connected to the front-end-related server, the first server may identify whether to generate the request for suspension and generate the request for suspension.

In addition, the case in which a current time of the front-end-related server is different from a predetermined period (e.g., an event discount period, an event provision period) related to an event may include a case in which a current time of the front-end-related server is Dec. 20, 2020, and a predetermined period related to an event is from Nov. 11, 2020, to Nov. 20, 2020. In some cases, the case in which a current time of the front-end-related server is different from a predetermined period (e.g., an event discount period, an event provision period) related to an event may include a case in which the current time is previous to the predetermined period, but not be limited thereto.

Also, the case in which the number of inputs received from a customer (or an electronic device of a customer) in response to the event information being provided through the front-end-related server exceeds the predetermined number of inputs may include, for example, a case in which customer's response inputs (e.g., use of coupons) to a current event are greater than or equal to the predetermined number or ratio (e.g., 80% of the total coupons provided).

Figure 3:
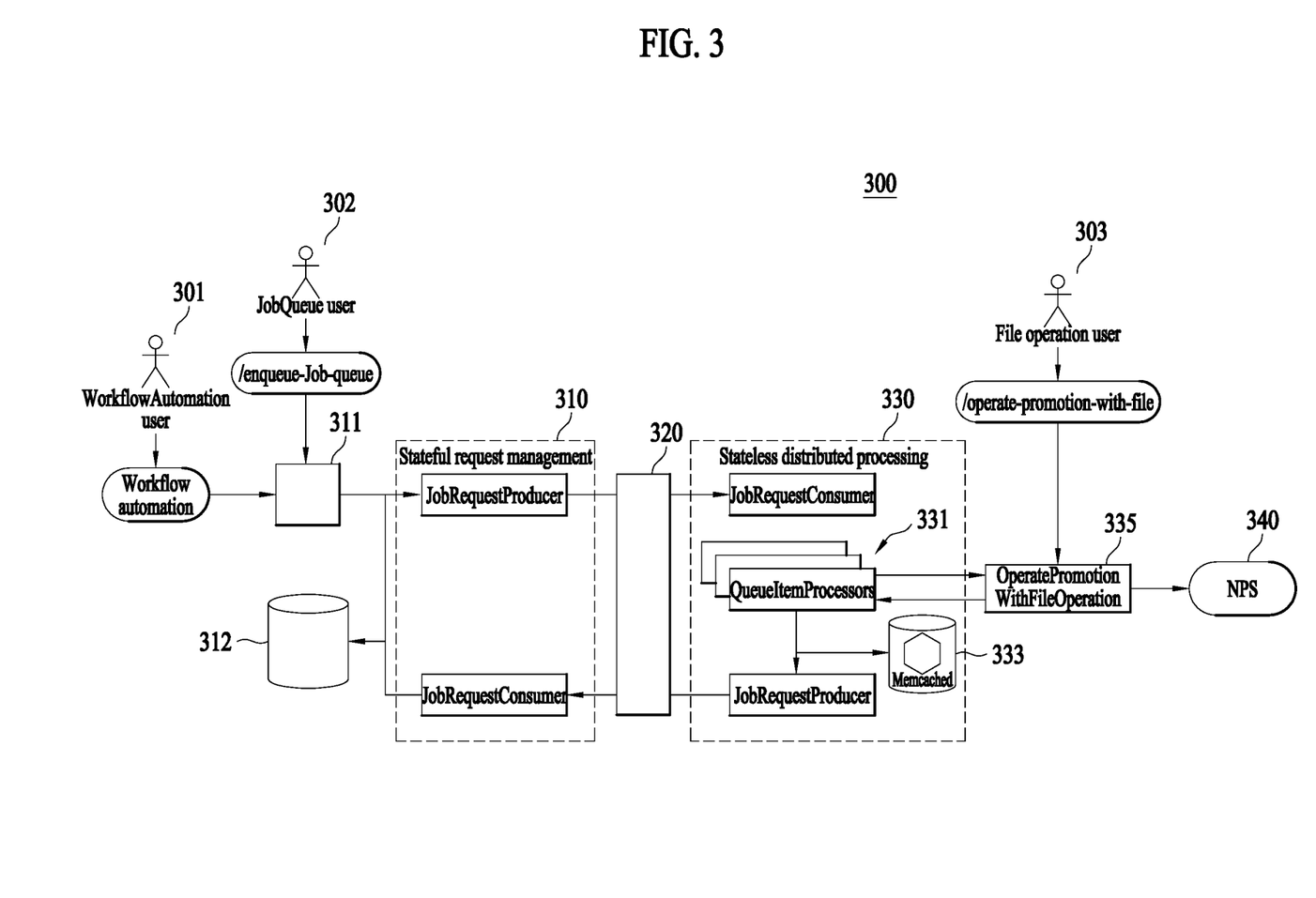
FIG. 3 is a diagram illustrating an example of an operation of a data processing system according to an example embodiment.

FIG. 3 is a diagram illustrating an example of an operation of a data processing system according to an example embodiment.

Referring to FIG. 3, a data processing system 300 may include a first server 310, a distributed message server 320, and a second server 330. In some cases, as illustrated, the data processing system 300 may further include a front-end-related server 340 but is not limited thereto. Also, in the following description, at least some components (e.g., an input part 311, a database 312, and an event manager 335) additionally provided in the data processing system 300 in association with FIG. 3 may be implemented in another component (e.g., the first server 310, the second server 330, the front-end-related server 340) of the data processing system 300 or omitted according to an implementation type, and the present embodiment is not limited thereto.

In the example embodiment, the input part 311 may receive user inputs from a first user 301 and a second user 302. Specifically, the input part 311 may receive an input of determining a job processing type related to event information generation, for example, for generating event information from the first user 301. The input part 311 may receive event information processed by the data processing system 300 from the second user 302. The event information may be, for example, information related to generating a service (e.g., a discount promotion, a coupon promotion) to be provided to a customer and may be referred to as a "job queue" in some cases. An example related to an input of event information will be described with reference to FIG. 5.

In the example embodiment, the input part 311 may be implemented as various configurations receiving an input. For example, the input part may be implemented in a form of another distributed message server distinguished from the distributed message server 320 described below or an online storage service.

In the example embodiment, the first server 310 may acquire information input to the input part 311. For example, the first server 310 may acquire information on a job processing method input from the first user 301 and acquire event information input from the second user 302. The first server 310 may allow the event information to be processed based on the job processing method.

Meanwhile, the job processing method may include, for example, a method of processing event information corresponding to a job request message by dividing the event information in response to the job request message for event information processing being distributed and provided to at least one server from the first server 310 through the distributed message server 320.

In the example embodiment, the first server 310 is a stateful server and may transmit the event information input from the input part 311 to the distributed message server 320. The distributed message server 320 may divide and transmit the received event information to at least one server. The at least one server may include the second server 330 of FIG. 3. Although not shown, the at least one server may include another server distinguished from the second server 330. In this case, the below-described operation of the second server 330 may be performed in another server likewise. In addition, the job request message transmitted to the second server 330 may also be transmitted to another server.

In the example embodiment, the distributed message server 320 may include a plurality of partitions corresponding to each of the at least one server. The distributed message server may generate a job request message corresponding to the event information and deploy the job request message to each of the plurality of partitions. When the event information is to generate 10000 promotions, and when the plurality of partitions is two partitions (in this case, the at least one server may be two servers), a job request message indicating to divide the 10000 promotions into two portions and generate 5000 promotions each may be distributed to each of the plurality of partitions. In response to the job request message being identified by each of the at least one server, processing of the event information, that is, the 5000 promotions may be generated by each of the at least one server.

In the example embodiment, the second server 330 may include at least one processor 331. When the at least one processor 331 is included in the second server 330, the second server 330 may use each of the at least one processor 331 to perform the processing of an assigned operation (e.g., generating 5000 promotions). Meanwhile, the at least one processor 331 may include a plurality of processors as illustrated, but it is merely an example.

In the example embodiment, when the processing of the event information is performed based on the job request message, the second server 330 may transmit the processed event information to the front-end-related server 340. In some cases, as illustrated in FIG. 3, the processed event information may be transmitted to the front-end-related server 340 through the event manager 335. Here, the event manager 335 may be connected to at least one server to receive the processed event information from the corresponding server and transmit the received event information to the front-end-related server 340.

In the example embodiment, various types of events may be generated through the first server 310, the distributed message server 320, and at least one server (e.g., the second server 330). In this case, a different front-end server may correspond to each type of event. For example, a first event may be provided to a customer through a first front-end-related server and a second event may be provided to a customer through a second front-end-related server. In this example, the event manager 335 may identify a type of an event received from at least one server and provide processed event information to a corresponding front-end-related server to the identified type.

In some examples, as illustrated, the event manager 335 may receive an input from a third user 303. The third user 303 may include a user controlling an operation of the event manager 335. In such cases, the event manager 335 may receive an input for a reference of an event type from the third user 303, classify processed event information based on the received input, and provide the event information to a corresponding front-end-related server.

In the example embodiment, when the processing is completed based on the job request message, the second server 330 may transmit information indicating that the processing is completed to the first server 310. The first server 310 may store the received information in the database 312. Meanwhile, FIG. 3 illustrates that the database 312 is provided separate from the first server 310, and it is merely an example. In some cases, the database 312 may be implemented to be included in the first server 310.

In the example embodiment, the data processing system 300 may include a distributed cache system 333. The distributed cache system 333 may be configured to store information associated with a job suspension. Meanwhile, FIG. 3 illustrates an example in which the distributed cache system 333 is included in the second server 330, but the example is not to be taken as being limited thereto. In some cases, the distributed cache system 333 may be implemented as a component separate from the second server 330.

The information stored in the distributed cache system 333 may be shared by at least one server and at least one processor included in the at least one server. In this case, whether the information received through the distributed message server 320 indicates a request for suspension may be identified based on the distributed cache system 333. For example, when the job request message is received through the distributed message server 320, the second server 330 may identify whether the job request message corresponds to the request for suspension based on the distributed cache system 333. Specifically, when the job request message is related to the request for suspension, the job request message may include predetermined information indicating the request for suspension. The predetermined information may be stored in the distributed cache system 333 in advance. Accordingly, when the job request message is received, the second server 330 may identify whether the job request message is related to the request for suspension through a comparison to the information stored in the distributed cache system 333.

In the example embodiment, when the job request message is related to the request for suspension, the second server 330 may suspend performing a processing operation corresponding to the job request message. For example, when the job request message is related to the request for suspension, the second server 330 may identify event information corresponding to the job request message from event information being processed by the second server 330 and suspend processing the identified event information.

In the example embodiment, in response to the processing of the event information being suspended, the second server 330 may record a status of the message corresponding to the event information as a suspended state. The second server 330 may upload at least a portion of the message recorded as the suspended state to the database 312 associated with the first server 310.

In some cases, the first server 310 may receive a request for resuming the processing of the message suspended. In such cases, the first server 310 may transmit the request for resuming to the second server 330 through the distributed message server 320. Information indicating the request for resuming may be stored in the distributed cache system 333 in advance. The second server 330 may identify the request for resuming based on the distributed cache system 333 and resume data processing.

Figure 4:
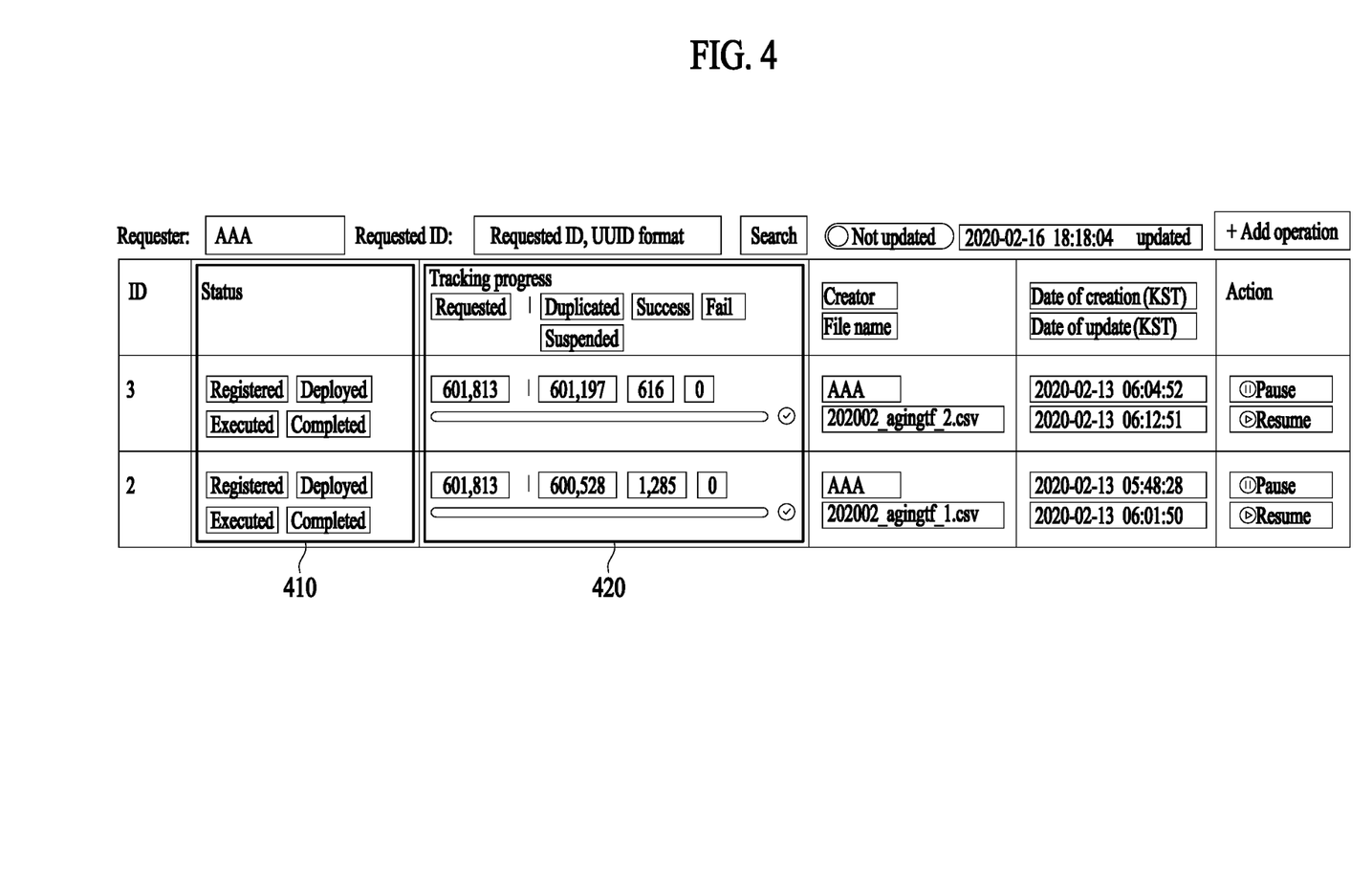
FIG. 4 is a diagram illustrating an example of providing data processing status information of a data processing system according to an example embodiment.

FIG. 4 is a diagram illustrating an example of providing data processing status information of a data processing system according to an example embodiment.

Referring to FIG. 4, information on a processing status of event information may be provided. For example, in a first area 410, information on a current state for the processing status of the event information may be briefly provided. Also, in a second area 420, detailed information on the processing status may be provided. The information on the current state may include information indicating that the current state corresponds to which state among "registered", "deployed", "executed", and "completed."

The detailed information on the processing status may include the number of events corresponding to each processing status item (e.g., duplicate, success, failure, suspension) of the event information on which the processing is performed. For example, when the event information is associated with generating 601813 events, the event information may include the number of events corresponding to each item among the 601813 events.

In the example embodiment, FIG. 4 illustrates an example of the screen provided to a user of the first server, but the example is not to be taken as being limited thereto.

Figure 5:
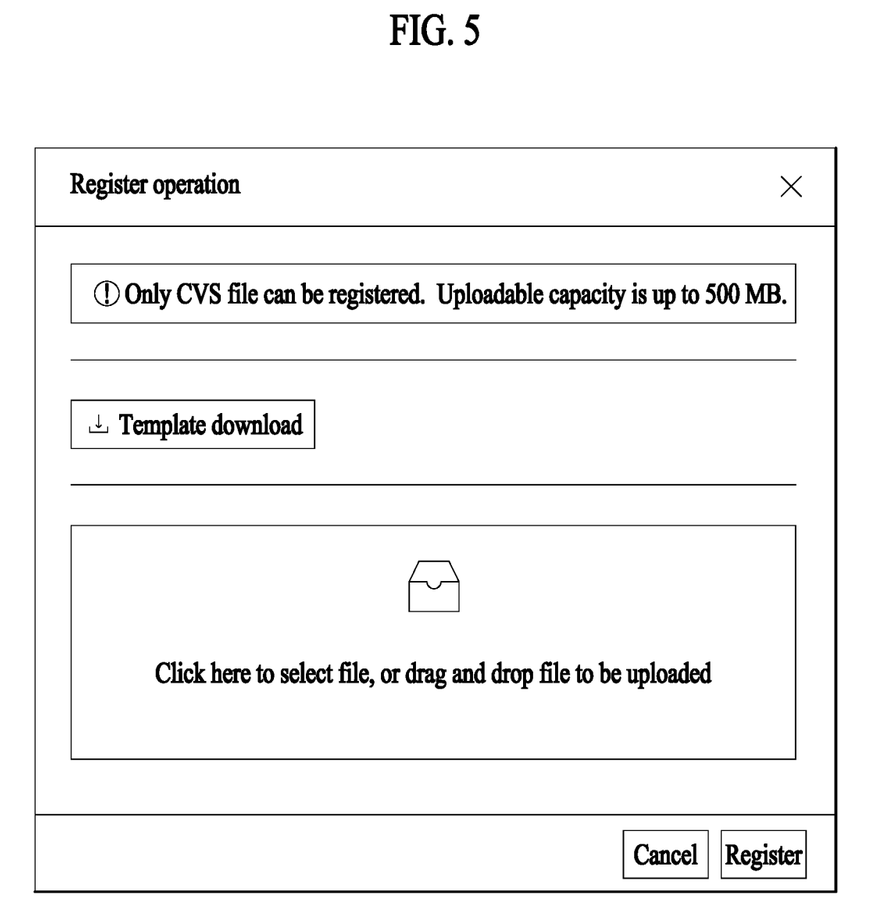
FIG. 5 is a diagram illustrating event information of a data processing system according to an example embodiment.

FIG. 5 is a diagram illustrating event information of a data processing system according to an example embodiment. Specifically, FIG. 5 illustrates an example of a screen provided for inputting information when event information is input based on an input of a user.

Referring to FIG. 5, a screen requesting event information to be input may be provided. The event information may include a file. In this case, the file corresponding to the event information may be uploaded on the screen as shown in FIG. 5. Through this, a first server may identify the event information and perform a data processing operation.

In FIG. 5, the file corresponding to the event information is referred to as a CSV file. However, embodiments of the present disclosure are not limited by such terminology.

In some cases, a format of an uploadable file may be determined in advance. In such cases, the first server may provide file format information, that is, a template on the screen of FIG. 5. For example, in response to a user's input to a button "template download" being received, the template may be downloaded to an electronic device of the user.

Figure 6:
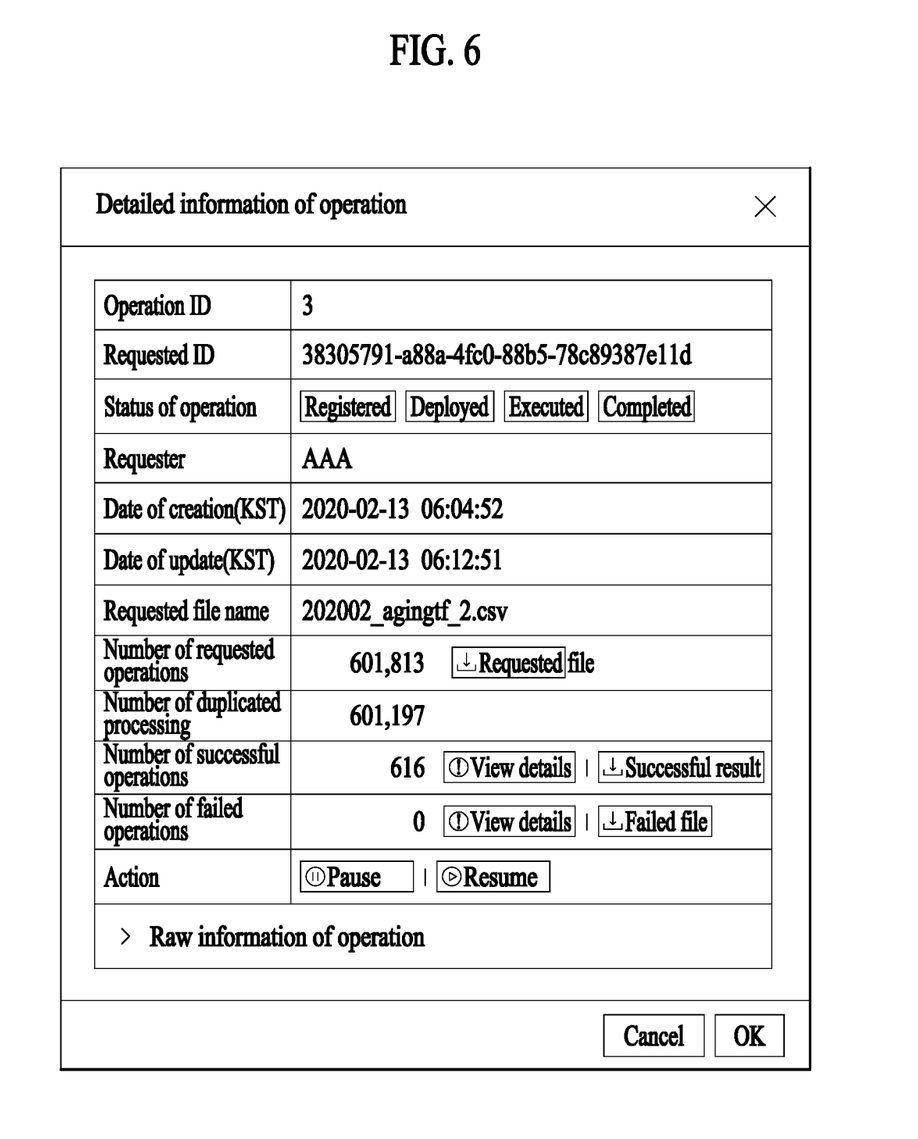
FIG. 6 is a diagram illustrating an example of providing data processing completion information of a data processing system according to an example embodiment.

FIG. 6 is a diagram illustrating an example of providing data processing completion information of a data processing system according to an example embodiment. Specifically, FIG. 6 illustrates an example of a screen for providing processing status information of event information when processing of the event information is completed.

Referring to FIG. 6, when the processing of the event information is completed, among the number of events corresponding to requested full event information, information on the number of processing success events, the number of processing failure events, and the number of duplicate events that an event has been already generated, so a new event is not generated may be displayed. In addition, information such as a job requester of the event information, a job request date, and an update date of job information may be provided. However, the information of FIG. 6 is merely an example, and the present example is not to be taken as being limited thereto. Thus, various information associated with the processing of the event information may be provided.

According to the present embodiments, the data processing system and the data processing method thereof may receive an input based on a stateful server (e.g., a first server) and allow a job to be processed based on a stateless server (e.g., a second server) so that the job processing is efficiently performed irrespective of a connection status.

As such, by using a distributed message service, an event generation request may be transmitted from the stateful server to the stateless server. The stateless server may adaptively adjust the number of processors to perform an operation based on an amount or types of operations, process the operations in parallel, and transmit a processing result to the stateful server using the distributed message service again. Also, by transmitting information associated with the job processing result to a server related to a front service, information according to the job processing result may be provided to a user. Through such operation, it is possible to prevent an excessive load occurring in the stateful server for changing or generating information and increase a processing speed by distributing a large number of operations in parallel.

In addition, according to the present embodiments, the data processing system and the data processing method thereof may process the large number of operations with increased speed by distributing the operations to a plurality of stateless servers such that the operations are performed in parallel.

Also, according to the present embodiments, the data processing system and the data processing method thereof may allow an operation to be suspended or restarted for the stateless server using a distributed cache system, thereby effectively managing an operation of the stateless server.

The electronic apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present example embodiments may be described in terms of functional block components and various processing steps. Such functional blocks may be realized by any number of hardware and/or software components configured to perform specified functions. For example, example embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

The above-described example embodiments are merely examples, and other embodiments may be implemented within the scope of the following claims.

What is claimed is:

1. A method of processing data in a data processing system using a distributed messaging system, the method comprising:
  acquiring, by a first server, event information associated with at least one item;
  transmitting, by the first server, a job creation request to a distributed message server based on the acquired event information;
  acquiring, by a second server, a job request message generated in the distributed message server based on the job creation request;
  processing, by the second server, event information using at least one processor based on the job request message; and
  transmitting, by the second server, the processed event information to a front-end-related server.

2. The method of claim 1, wherein the at least one processor is configured to share a distributed cache system, and
  the distributed cache system is configured to store information associated with job suspension.

3. The method of claim 2, further comprising:
  receiving, by the second server, a suspension request for suspending a job;
  suspending, by the second server, processing a job request message corresponding to the received suspension request and recording a state of the job request message for which the processing is suspended as a suspended state; and
  uploading at least a portion of the job request message recorded as the suspended state to a database associated with the first server.

4. The method of claim 3, wherein the recording comprises:
  identifying whether the received suspension request corresponds to information stored in the distributed cache system; and
  suspending, by the second server, processing the job request message in response to the received suspension request when the received suspension request corresponds to the information stored in the distributed cache system and recording a state of the job request message for which the processing is suspended as the suspended state.

5. The method of claim 3, further comprising:
  identifying a resuming request for at least a portion of the job request message recorded as the suspended state and uploaded to the database; and
  transmitting at least a portion of a message corresponding to the resuming request from the first server to the second server through the distributed message server.

6. The method of claim 3, wherein the suspension request is generated in response to a job processing time of the front-end-related server exceeding a predetermined value.

7. The method of claim 3, wherein the suspension request is generated based on an input of a user of the first server.

8. The method of claim 1, further comprising:
  providing, by the second server, the processed event information to the first server through the distributed message server.

9. The method of claim 1, wherein the event information comprises at least one of a number of events, a discount amount, an event name, an event type, a delivery type, an item type, a sales period, a discount payment type, an event start time, and an event end time.

10. The method of claim 1, wherein the distributed message server comprises a plurality of partitions, and
  the second server corresponds to one of the plurality of partitions.

11. The method of claim 1, wherein the processing of the event information comprises:
  identifying the at least one processor based on the job creation request; and
  dividing and processing the event information using each of the at least one processor.

12. A non-transitory computer-readable recording medium comprising a computer program for performing the method of claim 1.

13. A system for processing data using a distributed messaging system, the system comprising:
  a first server comprising a first processor configured to acquire event information associated with at least one item and transmit a job creation request to a distributed message server based on the acquired event information;
  the distributed message server comprising a second processor configured to transmit a job request message to a second server based on the job creation request; and
  the second server comprising a third processor configured to process event information using at least one processor based on the job request message and transmit the processed event information to a front-end-related server.

* * * * *